United States Patent
Gudenkauf et al.

(10) Patent No.: US 7,856,505 B2
(45) Date of Patent: Dec. 21, 2010

(54) INSTANTIATING A COMMUNICATION PIPELINE BETWEEN SOFTWARE

(75) Inventors: John C. Gudenkauf, Bellevue, WA (US); Thomas E. Quinn, Jr., Seattle, WA (US); Zifeng He, Redmond, WA (US); Jesse D. Kaplan, Redmond, WA (US); Peter H. Sheill, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 11/824,384

(22) Filed: Jun. 29, 2007

(65) Prior Publication Data

US 2009/0006629 A1    Jan. 1, 2009

(51) Int. Cl.
*G06F 15/16* (2006.01)
(52) U.S. Cl. .......................... 709/227; 717/174
(58) Field of Classification Search ................. 709/246, 709/227; 719/315, 328; 718/106; 717/130, 717/120, 174; 1/1
See application file for complete search history.

(56) References Cited

U.S. PATENT DOCUMENTS

| 5,420,981 | A |   | 5/1995  | Ivie et al. |
|-----------|---|---|---------|-------------|
| 5,742,499 | A |   | 4/1998  | Reynolds |
| 6,006,279 | A | * | 12/1999 | Hayes ........................ 719/328 |
| 6,704,750 | B2 | * | 3/2004 | Asazu ............................... 1/1 |
| 6,782,531 | B2 | * | 8/2004 | Young ........................ 717/130 |
| 7,254,814 | B1 | * | 8/2007 | Cormier et al. ............. 718/106 |
| 7,698,685 | B2 | * | 4/2010 | Pepin et al. ................ 717/120 |
| 2004/0034860 | A1 | * | 2/2004 | Fernando et al. ............ 719/315 |
| 2006/0067209 | A1 |   | 3/2006 | Sheehan et al. |
| 2006/0069717 | A1 |   | 3/2006 | Mamou et al. |
| 2006/0294494 | A1 |   | 12/2006 | Quinn et al. |
| 2007/0016691 | A1 | * | 1/2007 | Pepin et al. ................. 709/246 |
| 2007/0083512 | A1 |   | 4/2007 | Pepin et al. |
| 2007/0083675 | A1 |   | 4/2007 | Vemulapelli et al. |

FOREIGN PATENT DOCUMENTS

WO      2004107189 A2    12/2004

OTHER PUBLICATIONS

Dehon, et al.,"METRO: A Router Architecture for High-Performance, Short-Hual Routing Networks", Proceedings of the 21st annual international symposium on Computer architecture table of contents, Chicago, Illinoius, United States, Date: 1994, pp. 266-277, IEEE Computer Society Press, Los Alamitos, CA, USA.
Morrone, et al., "A Multi-Threaded Runtime System for a Multi-Processor/Multi-Node Cluster", Date: 2001, pp. 1-15, Kluwer Academic Publisher, Netherlands.
Aumage et al., "NETIBIS: An Efficient and Dynamic Communication System for Heterogeneous Grids", Fifth IEEE International Symposium on Cluster Computing and the Grid (CCGrid'05)—vol. 2, Cardiff, Wales, UK, May 9-12, 2005, 8 pages.

* cited by examiner

*Primary Examiner*—Jungwon Chang

(57) ABSTRACT

An embodiment not only instantiates a pipeline that allows communication between first and second executable nodes regardless of whether the nodes have compatible or incompatible interface views, but also structures the pipeline based on the relationship between the interface views so, for example, the pipeline does not consume unnecessary overhead or introduce unnecessary data-transfer delay. For example, an embodiment compares a first interface view of a first executable node to a second interface view of a second executable node. A first communication pipeline having a first structure is instantiated between the first and second nodes if the first view has a first pre-established relationship to the second view, and a second communication pipeline having a second structure is instantiated between the first and second nodes if the first view has a second pre-established relationship to the second view.

13 Claims, 5 Drawing Sheets

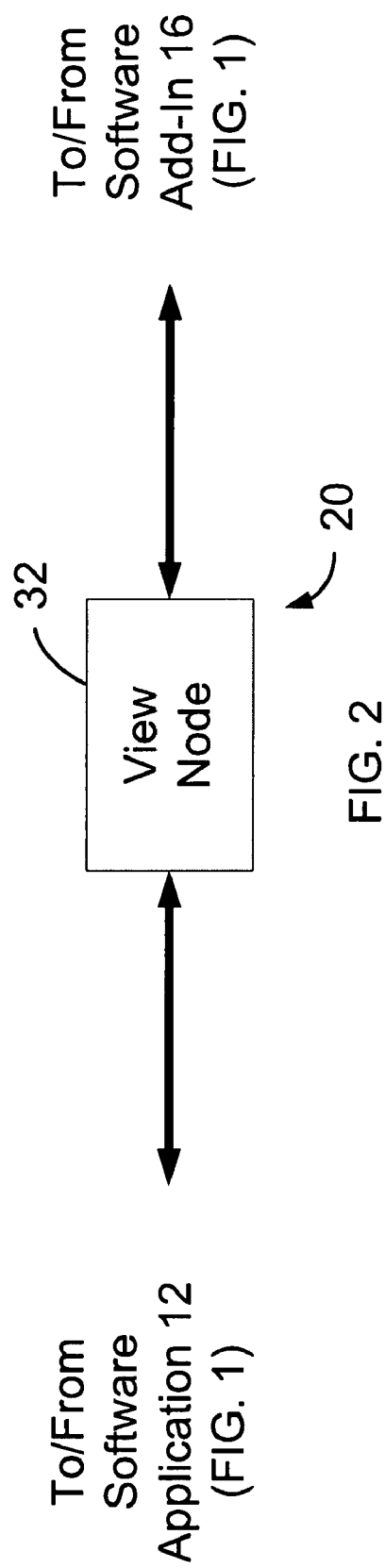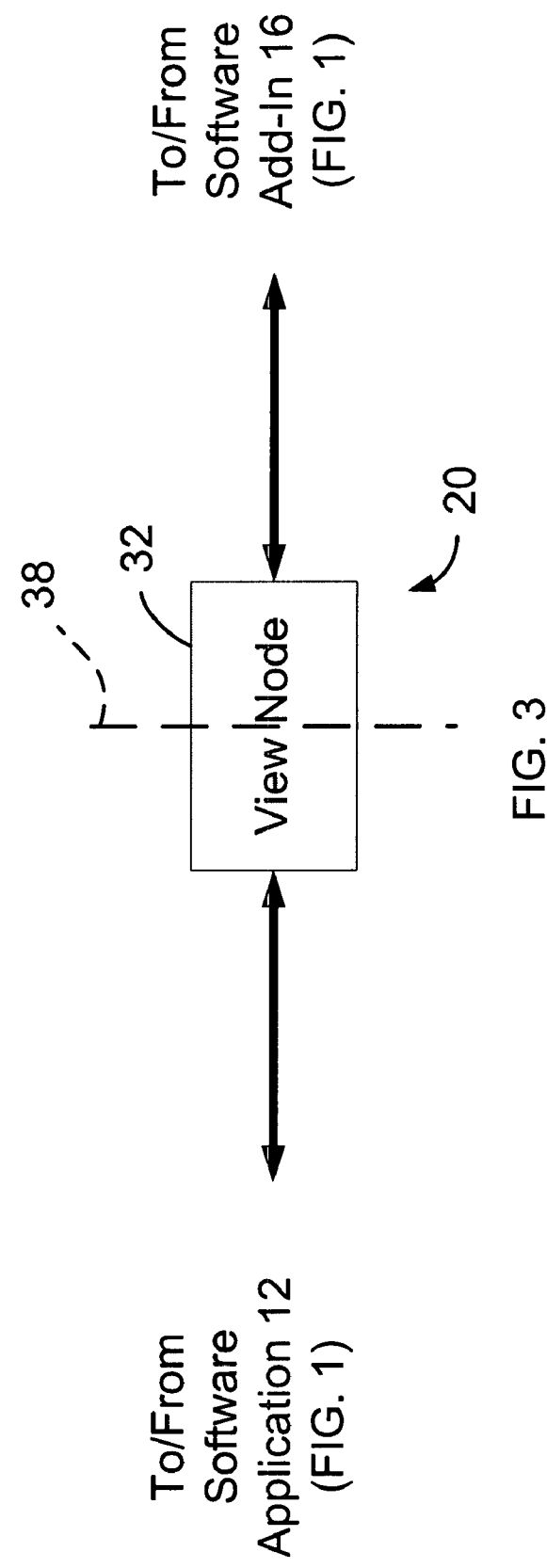

INSTANTIATING A COMMUNICATION PIPELINE BETWEEN SOFTWARE

CROSS REFERENCE TO RELATED APPLICATIONS

This application is related to U.S. Patent Application Publication Nos. 2007/0016691 A1, filed on Jul. 14, 2005, and 2007/0083512 A1, filed on Oct. 12, 2005, which have a common owner and which are incorporated by reference.

BACKGROUND

In a runtime environment, an executable software node may need the services of, and thus may need to communicate with, another executable software node. Generally, an executable software node is a set of software instructions that, when executed, perform one or more functions. Examples of executable software nodes include software applications such as word processors and web browsers, and include software add-ins such as spell checkers and web-browser toolbars.

As an example of one executable node needing to communicate with another executable node, when a user of a word processor invokes a spelling tool to obtain a correct spelling of a word, the word processor may call a spell-checker add-in to perform this service, in which case the word processor and the add-in need to communicate with one another. The user may invoke the spelling tool via the word processor's drop-down menu, and in response to this invocation, the word processor makes a software call to the spell-checker add-in. Next, the word processor transfers to the add-in the word for which the user wants the correct spelling. After determining the correct spelling of the word, the add-in sends the correctly spelled word back to the word processor, or sends an indication to the word processor that the word is spelled correctly.

To give a first executable node the ability to communicate with a second executable node, one typically designs the first executable node to have the same interface view (hereinafter shortened to "view") as the second executable node. A view of an executable node is itself an executable software node, e.g., an application programming interface (API), via which the executable node can communicate with another executable node. Therefore, designing the first executable node to have the same view as the second executable node allows the two executable nodes to communicate with one another via a common view. For example, designing a spell-check add-in to have the same view as a word processor allows the add-in to communicate with, and thus to "work" with, the word processor.

Executable software nodes are sometimes updated with such frequency and on such unpredictable schedules that it may be difficult to ensure that the current version of a first executable node will always have the same view as the current version of a second executable node that is designed to work with the first node. For example, a software provider may update a word processor on an unpredictable schedule that is partially driven by the need to resolve unforeseen compatibility issues, and some of these updates may involve a change to the view. Consequently, there may be periods during which an add-in designed for the word processor does not work with the current version of the word processor because the add-in provider has yet to update the add-in's view to be compatible with the word processor's new view.

Unfortunately, if a current version of a first executable node does not have the same view as, and thus does not work with, a current version of a second executable node designed to work with the first node, then the current version of the first node is not "backwards compatible" with the current version of the second node. Such lack of backwards compatibility may reduce the number of users who update to the current version of the first node, and thus may reduce sales of the first node. For example, suppose that the current version of a word processor is not backwards compatible with, and thus does not work, with the current version of a particular spell checker. If a user of the word processor wants to retain the ability to use the spell checker, then he may forgo updating to the current version of the word processor, at least until a compatible version of the spell checker is released.

One way to eliminate periods during which a first executable software node is not backwards compatible with a second executable node that is designed to work with the first node is to simultaneously release the latest versions of the first and second nodes.

But unfortunately, simultaneously releasing the latest versions of the first and second software nodes is often impractical, particularly where the first and second nodes are developed by different software providers.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

An embodiment is operable not only to instantiate a pipeline that allows communication between first and second executable nodes regardless of whether the nodes have compatible or incompatible views, but is also operable to structure the pipeline based on the relationship between the views so, for example, the pipeline does not consume unnecessary overhead or introduce unnecessary data-transfer delay.

For example, an embodiment compares a first view of a first executable node to a second view of a second executable node. A first communication pipeline having a first structure is instantiated between the first and second nodes if the first view has a first pre-established relationship to the second view, and a second communication pipeline having a second structure is instantiated between the first and second nodes if the first view has a second pre-established relationship to the second view.

BRIEF DESCRIPTION OF THE DRAWINGS

FIG. 2 is a diagram of an embodiment of the pipeline of FIG. 1 where the application and add-in views are interface compatible and neither the software application nor the software add-in requires an isolation boundary.

FIG. 3 is a diagram of an embodiment of the pipeline of FIG. 1 where the application and add-in views are interface compatible, one or both of the software application and software add-in require an isolation boundary, and at least one of the application and add-in views can send and receive data across the isolation boundary.

DETAILED DESCRIPTION

Figure 1:
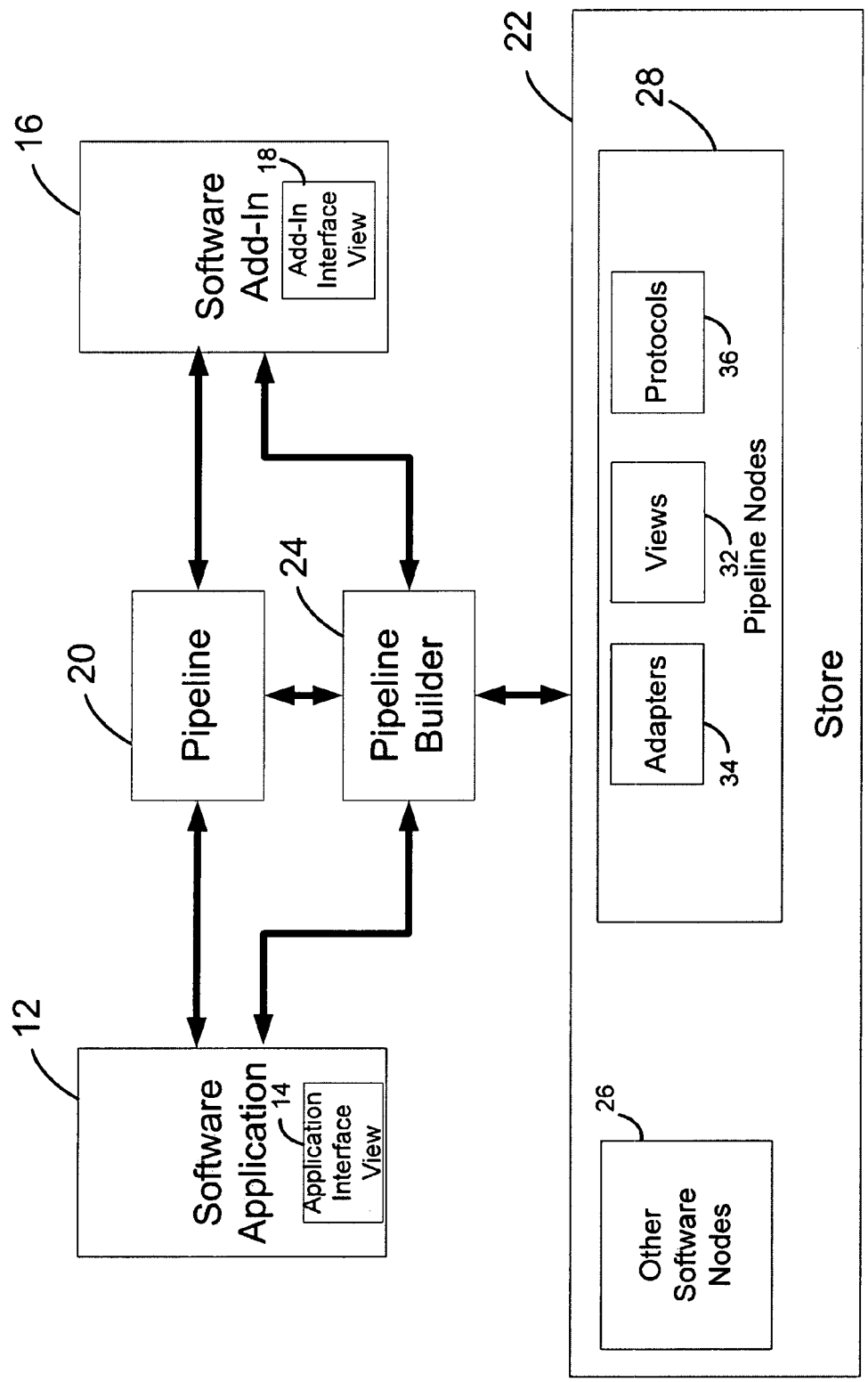
FIG. 1 is a diagram of an embodiment of a run-time environment that includes a communication pipeline between a software application and a software add-in and that includes a pipeline builder for designing and instantiating the pipeline.

FIG. 1 is a diagram of an embodiment of a run-time environment 10 that includes the following components: a first executable software node (here a software application) 12 having a view 14, a second executable software node (here a software add-in) 16 having a view 18, a communication pipeline 20 via which the application and add-in communicate, a store 22, and a pipeline builder 24 that is operable to design and instantiate the pipeline from executable pipeline nodes in the store. Although for purposes of example the first node 12 is described as being a software application and the second node 16 is described as being a software add-in, it is contemplated that each of the first and second nodes may be any type of software node.

As further discussed below, an embodiment of the pipeline builder 24 is operable to design and instantiate the pipeline 20 regardless of whether the application and add-in views 14 and 18 are interface compatible or incompatible; consequently, the pipeline builder is operable to provide a communication pathway between two executable software nodes even if the nodes have different views. Therefore, the pipeline builder 24 may allow the application 12 to be backwards compatible with the add-in 16 even if the application view 14 is not the same as or otherwise interface compatible with the add-in view 18. Furthermore, an embodiment of the pipeline builder 24 is operable to structure the pipeline 20 based on a relationship between the application and add-in views 14 and 18 so that the pipeline does not consume unnecessary execution overhead or introduce unnecessary data-transfer delay. In addition, an embodiment of the pipeline constructor 24 is operable to locate and instantiate the add-in 16 at the request of the application 12.

Still referring to FIG. 1, the run-time environment 10 may include one or more execution domains that are resident on one or more processors (not shown). If the environment 10 resides on more than one processor, then these processors may be disposed within one computer system (not shown) or within multiple computer systems (not shown) that are connected to one another via a network such as a local-area network (LAN) or the internet (not shown). As discussed below in conjunction with FIGS. 2-4, if the run-time environment 10 includes multiple execution domains, then the components of the environment may be distributed among these domains in any suitable manner. Furthermore, the components (or the code that composes the components) of the run-time environment 10 may be stored on a medium, e.g., a magnetic or optical disc, or a non-volatile semiconductor device.

The software application 12 may be any software application, e.g., a word processor, and the add-in 16 may be any add-in, e.g., a spell checker for the word processor.

The application view 14 is a software node (e.g., an application-program-interface (API) node) that may be part of the application 12 or that may be stored separately from the application, and that may have any suitable format. For example, the application view 14 may be a portion of the application 12 source code that is compiled and run at the same time as the rest of the source code for the application. Or, the application view 14 may be a group of extensive mark-up language (XML) comments that are part of the code for the application 12. Alternatively, as discussed below, the application view 14 may be a piece of source or managed code, or a group of XML statements, that is/are stored in the store 22 as a file that is separate from the application 12. In the embodiment described in conjunction with FIG. 1, the application view 14 is a portion of the source code for the application 12, and is thus shown in FIG. 1 as being part of the application.

Similarly, the add-in view 18 is a software node (e.g., an API node) that may be part of the add-in 16 or that may be stored separately from the add-in, and that may have any suitable format. For example, the add-in view 18 may be a portion of the add-in 16 source code that is compiled and run at the same time as the rest of the source code for the add-in. Or, the add-in view 18 may be a group of extensive mark-up language (XML) comments that are part of the code of the add-in 16. Alternatively, as discussed below, the add-in view 16 may be a piece of source or managed code, or a group of XML statements, that is/are stored in the store 22 as a file that is separate from the add-in 16. In the embodiment described in conjunction with FIG. 1, the add-in view 18 is a portion of the source code for the add-in 16, and is thus shown in FIG. 1 as being part of the add-in.

The pipeline 20 includes one or more executable pipeline nodes that cooperate to transfer data from the application 12 to the add-in 16 and from the add-in 16 to the application 12. Alternatively, depending on the function of the add-in 16, the pipeline 20 may be unidirectional instead of bidirectional. That is, the pipeline 20 may transfer data only from the application 12 to the add-in 16, or only from the add-in 16 to the application 12. As discussed below, the pipeline builder 24 determines the structure of the pipeline 20, e.g., the number, type, and arrangement of the pipeline nodes, based on a relationship between the application and add-in views 14 and 18.

The store 22 includes the following sub-stores: other software nodes 26, and pipeline nodes 28. Alternatively, the store 22 may include no sub-stores.

The other-software-nodes sub-store 26 may store one or more software nodes, e.g., software applications (such as the application 12) and software add-ins (such as the add-in 16) that the application 12 (or other software nodes) may call. Furthermore, the stored software nodes may have any suitable format. For example, these nodes may be written in source code that has been compiled prior to run time. Or, these nodes may be written in managed code that can be compiled at run time. The sub-store 26 may also have any suitable format. For example, the sub-store 26 may be a folder that includes each of the software nodes in the form of a respective file. Alternatively, the sub-store 26 may be omitted from the store 22.

The pipeline sub-store 28 may store executable pipeline nodes from which the pipeline builder 24 designs and instantiates the pipeline 20. More specifically, an embodiment of the sub-store 28 stores three types of pipeline nodes: view nodes 32 (e.g., API nodes), adapter nodes 34, and protocol nodes 36. The view, adapter, and protocol nodes 32, 34, and 36 may have any suitable format. For example, these nodes may be written in source code that has been compiled prior to run time. Or, these nodes may be written in managed code that the pipeline builder 24 can compile at run time. The functions of the view, adapter, and protocol nodes 32, 34, and 36 are further discussed below in conjunction with FIGS. 2-4. The sub-store 28 may have any suitable format. For example, the sub-store 28 may be a folder that includes each of the view, adapter, and protocol nodes 32, 34, and 36 in the form of a respective file. Furthermore, some or all of the view nodes 32 may be stored in the sub-store 26 as parts of other software nodes. For example, if the application view 14 is part of the application 12 as shown, then the application view may be stored in the sub-store 26 as part of the application. But if the application view 14 is separate from the application 12, then the application view may be stored in the sub-store 28. A similar analysis applies to the add-in view 18. If all of the views 32 are part of respective other software nodes, then no views may be stored in the sub-store 28.

An embodiment of the pipeline builder 24 is an executable software node that designs and instantiates the pipeline 20, and that structures the pipeline based on the relationship between the application view 14 and the add-in view 18. Example relationships between the application and add-in views 14 and 18, and example corresponding structures of the pipeline 20, are discussed below in conjunction with FIGS. 2-4. Typically, the builder 24 designs and instantiates the pipeline 20 in response to a request from the software application 12, although the builder may design and instantiate the pipeline in response to a request from the add-in 16 or from any other source. If the pipeline builder 24 is not instantiated prior to the request, then the request may serve to instantiate the builder. The pipeline builder 24 may have any suitable format, such as being written in object code or managed code, and may be part of the software application 12, part of the add-in 16, or separate from both the application and the add-in. If part of the application 12 or add-in 16, then the pipeline builder 24 is stored wherever the application or add-in is stored. If separate from the application 12 and the add-in 16, then the pipeline builder 24 may be stored in the other-software-nodes sub-store 26 or in any other suitable location.

Furthermore, as discussed above, an embodiment of the pipeline builder 24 is operable to locate and instantiate the add-in 16 (or any other software node) in response to a request from the application 12 (or any other software node). For example, suppose that the application 12 is a word processor, and a user requests the correct spelling of an English language word. The word processor provides to the builder 24 a request for a spell-check add-in, and also provides to the builder one or more requirements that the add-in must meet, such as the ability to spell check English language words. In response to this request, the builder 24 searches the sub-store 26 (or other location) for an add-in that meets the specified requirements. Assuming that the builder 24 finds that the add-in 16 meets the specified requirements, it qualifies the add-in as being suitable to satisfy the request, and then designs the pipeline 20, instantiates the add-in (if the add-in is not already instantiated), and instantiates the designed pipeline 20. If the builder 24 finds multiple add-ins that meet the specified requirements, then it may ask the application 12 to select the add-in that the application "wants" the pipeline builder to instantiate, or the builder itself may select one of the add-ins based on pre-established criteria. Techniques for locating and instantiating an add-in are also discussed in U.S. Patent Application Publication No. 2007/0083512 A1, which was previously incorporated by reference.

FIG. 2 is a diagram of an embodiment of the pipeline 20 that the pipeline builder 24 (FIG. 1) may design and instantiate if the application view 14 (FIG. 1) is interface compatible with the add-in view 18 (FIG. 1), and neither the application 12 nor the add-in 16 specifies an isolation boundary. By designing the pipeline 20 to include only a single pipeline node (here a single view node 32), the pipeline may require less execution overhead and may impart a shorter delay to transferred data than a pipeline that includes multiple pipeline nodes.

Referring to FIGS. 1-2, the application view 14 is interface compatible with the add-in view 18 if the views are identical, or otherwise if each of the views is operable by itself to transfer data between the application 12 and the add-in 16.

Because the application and add-in views 14 and 18 are interface compatible in this example, the pipeline 20 need include only a single pipeline node, here a single view node 32, for transferring data between the application 12 and the add-in 16. Because the application and add-in views 14 and 16 are interface compatible, the pipeline builder 24 may instantiate either the application view or the add-in view as the view node 32. For example, if the pipeline builder 24 designs and instantiates the application view 14 as the view node 32, then the builder retrieves the application view 14 from the application 12 if the view is part of the application; otherwise, the builder may retrieve the application view 14 from the sub-store 28 or from another location. Likewise, if the pipeline builder 24 designs and instantiates the add-in view 18 as the node 32, then the builder retrieves the view 18 from the add-in 16 if the view is part of the add-in; otherwise, the builder may retrieve the add-in view 18 from the sub-store 28 (FIG. 1) or from another location.

During pipeline operation, the view node 32 receives data from the application 12 and provides this data to the add-in 16, and receives data from the add-in 16 and provides this data to the application 12. If the pipeline 20 is unidirectional, then the interface node 32 transfers data in only one direction. Furthermore, the application 12, add-in 16, and view node 32 may all run in the same execution domain, or may run in two or more different execution domains.

FIG. 3 is a diagram of an embodiment of the pipeline 20 that the pipeline builder 24 (FIG. 1) may design and instantiate if the application view 14 (FIG. 1) is interface compatible with the add-in view 18 (FIG. 1) and one or both of the application 12 and the add-in 16 requires an isolation boundary 38 across which the application and add-in views are remotable—the application and add-in views are remotable across the boundary if the views are able to send and/or receive data across the boundary. By designing and instantiating the pipeline 20 to include only one pipeline node (here one view node 32), the pipeline may require less execution overhead and may have a shorter data-transfer delay than a pipeline that includes more than one pipeline node.

Referring to FIGS. 1 and 3, the isolation boundary 38 provides a pre-established level of isolation between the application 12 and the add-in 16. For example, the boundary 38 may restrict the application 12 (e.g., a word processor or browser) from sending a certain type of data (e.g., the personal information of a user) to the add-in 16. Therefore, in this example, the boundary 38 prevents an unauthorized party from acquiring the restricted information via the add-in 16.

Typically, a platform with which the run-time environment 10 is compatible defines a number (e.g., ten) of pre-established isolation levels, with the lowest level providing the least isolation, and the highest level providing the greatest isolation. For example, the lowest isolation level may restrict the transfer of fewer data types than the highest isolation level.

Either or both of the application 12 and the add-in 16 may require the isolation boundary 38 to have a specified isolation level, or to have an isolation level within a specified range of isolation levels. For example, the application 12 may specify an isolation boundary of, e.g., "level two or greater", and the add-in may specify, e.g., no isolation boundary or an isolation boundary of "level three or lower."

As long as the application 12 and add-in 16 specify the same isolation level, or overlapping ranges of isolation levels, the application and add-in are isolation compatible. For example, the application 12 and add-in 16 are isolation compatible if they both require an isolation boundary of "level two", or require an isolation boundary of "level of two or greater." The application 12 and add-in 16 are also isolation compatible, for example, if the application requires an isolation boundary of "level of two or greater," and the add-in requires an isolation boundary of "level of two or lower," because both can transfer data across a common isolation boundary of "level two." But the application 12 and the add-in 16 are isolation incompatible if, for example, the application requires an isolation boundary of "level five or greater," and the add-in requires an isolation boundary of "level four or lower," because there is no common isolation boundary across which both the application and add-in may transfer data.

Still referring to FIGS. 1 and 3, the application and add-in views 14 and 18 indicate the isolation levels across which they are remotable. For example, the application view 14 may indicate that it is remotable across an isolation boundary of "level five or lower," and the add-in view 18 may indicate that it is remotable across an isolation boundary of "level two or higher." It is also contemplated that either or both of the application view 14 and the add-in view 18 are not remotable across an isolation boundary of any isolation level.

As long as the application view 14 and add-in view 18 are both remotable across at least one common isolation boundary, the application view and add-in view are isolation compatible. For example, if the application view 14 is remotable across an isolation boundary having a "level two or higher" and the add-in view 18 is remotable across an isolation boundary having a "level three or lower," then the views are isolation compatible because each is remotable across a level-two boundary and a level-three boundary.

Still referring to FIG. 3, to implement the isolation boundary 38, the pipeline builder 24 (FIG. 1) designs the pipeline 20 to include one and only one node, here a view node 32, which may be the same as either of the application or add-in views 14 and 18 as discussed below.

First, the pipeline builder 24 determines that one or both of the application 12 and add-in 16 require an isolation boundary.

Next, the pipeline builder 24 determines whether there exists a common isolation boundary with which both the application 12 and add-in 16 are compatible.

If there exists no common isolation boundary with which both the application 12 and add-in 16 are compatible, then the pipeline builder 24 determines that it cannot design or instantiate the pipeline 20 of FIG. 3—the builder may, however, determine that it can, design and instantiate the pipeline 20 of FIG. 4 as discussed below.

But if there exists at least one common isolation boundary with which both the application 12 and add-in 16 are compatible, then the pipeline builder 24 determines whether at least one of the application and add-in views 14 and 18 is compatible with the at least one common isolation boundary.

If at least one of the application and add-in views 14 and 18 is compatible with the at least one common isolation boundary, then the pipeline builder 24 may design and instantiate the pipeline 20 of FIG. 3. First, the builder 24 selects which of the at least one common isolation boundaries to implement as the isolation boundary 38. For example, the builder 24 may select the at least one common isolation boundary having the lowest isolation level. Next, the builder 24 selects for implementation as the view node 32 the one of the application and add-in views 14 and 18 that is remotable across the boundary 38—if both of the application and add-in views are remotable across the boundary 38, then the builder 24 may select either of the application and add-in views for implementation as the view node 32.

Still referring to FIG. 3, during operation of the pipeline 20, the view node 32 receives data from the application 12 and provides this data across the isolation boundary 38 to the add-in 16, and receives data from the add-in 16 and provides this data across the isolation boundary to the application. If the pipeline 20 is unidirectional, then the view node 32 transfers data in only one direction. Furthermore, the application 12, add-in 16, and view node 32 may all run in the same execution domain, or may run in two or more different execution domains. For example, the isolation boundary 38 may require the application 12 and the interface node 32 to run in a first execution domain, and may require the add-in 16 to run in a second execution domain.

Figure 4:
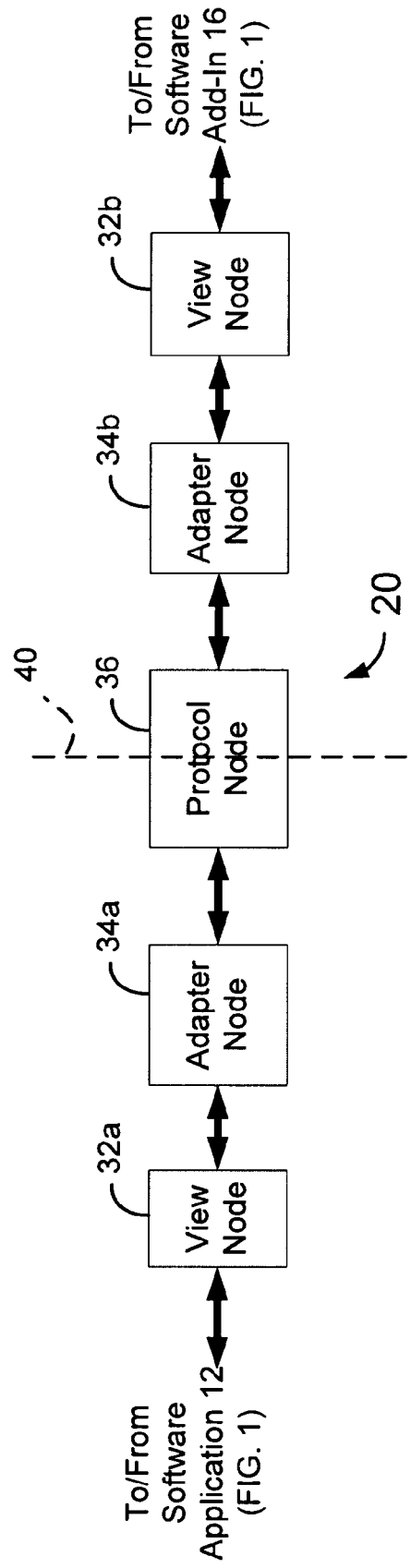
FIG. 4 is a diagram of an embodiment of the pipeline of FIG. 1 where the application and add-in views are interface incompatible.

FIG. 4 is a block diagram of an embodiment of the pipeline 20 that the pipeline builder 24 (FIG. 1) may design and instantiate if the application view 14 (FIG. 1) is not interface compatible with the add-in view 18 (FIG. 1), regardless of whether either of the application 12 or add-in 16 requires an isolation boundary. The pipeline builder 24 (FIG. 1) designs the pipeline 20 to include five pipeline nodes, here two view nodes 32a and 32b, two adapter nodes 34a and 34b, and a protocol node 36. By instantiating the pipeline 20 to include only five pipeline nodes 32a, 32b, 34a, 34b, and 36, the pipeline may require less execution overhead and have a shorter delay than a pipeline that includes more than five pipeline nodes.

The pipeline builder 24 may implement the application view 14 as the view node 32a, and may implement the add-in view 18 as the view node 32b.

The adapter 34a may be any executable node suitable for transferring data between the view node 32a and the protocol node 36, and the adapter 34b may be any executable node suitable for transferring data between the view node 32b and the protocol node.

The protocol node 36 may be any node suitable for transferring data between the adapters 34a and 34b according to any known protocol. Examples of known protocols include the Internet Protocol (IP) and the Transmission Control Protocol (TCP).

The protocol node 36 may implement an isolation boundary 40 required by either or both of the application 12 and the add-in 16 as long as the application and add-in are isolation compatible as discussed above in conjunction with FIG. 3. But because the protocol node 36 implements the isolation boundary 40, the pipeline builder 24 may design and instantiate the pipeline 20 even if the application and add-in views 14 and 18 are not isolation compatible with each other or with the isolation boundary.

Still referring to FIG. 4, during operation of the pipeline 20, the view node 32a receives data from the application 12 and provides this data to the adapter node 34a, and receives data from the adapter 34a and provides this data to the application 12. Similarly, the adapter node 34a transfers data between the view node 32a and the protocol node 36, the protocol node transfers data between the adapter nodes 34a and 34b (across the isolation boundary 40 if present), the adapter node 34b transfers data between the protocol node and the view node 32b, and the view node 32b transfers data between the adapter node 34b and the add-in 16. If the pipeline 20 is unidirectional, then the pipeline nodes 32a, 32b, 34a, 34b, and 36 transfer data in only one direction. Furthermore, the application 12, add-in 16, and the pipeline nodes 32a, 32b, 34a, 34b, and 36 may all run in the same execution domain, or may run in two or more different execution domains. For example, if the isolation boundary 40 is present, then the application 12, the view node 32a, the adapter node 34a, and the protocol node 36 may run in a first execution domain, and the adapter node 34b and the add-in 16 may run in a second execution domain. A pipeline similar to the pipeline 20 of FIG. 4 is described in U.S. Patent Application Publication No. 2007/0016691 A1, which was previously incorporated by reference.

Referring again to FIGS. 1-4, in summary, an embodiment of the pipeline builder 24 designs and instantiates the "shortest" available pipeline 20 (i.e., the pipeline having the fewest pipeline nodes) between the application 12 and the add-in 16. If the application and add-in views 14 and 18 are interface compatible and the application 12 and the add-in 16 do not require an isolation boundary, then the builder 24 may design and instantiate the pipeline 20 having only a single pipeline node, for example as discussed above in conjunction with FIG. 2. If either or both the application 12 and the add-in 16 require an isolation boundary and the application and add-in views 14 and 18 are interface compatible and remotable across the isolation boundary, then the builder 24 may design and instantiate the pipeline 20 implementing the isolation boundary and have only one pipeline node, for example as discussed above in connection with FIG. 3. And if the application and add-in views 14 and 18 are interface incompatible, then the pipeline builder 24 may design and instantiate the pipeline 20 having only five pipeline nodes, for example, as discussed above in connection with FIG. 4. Consequently, as long as the store 22 stores the necessary pipeline nodes (or the pipeline builder 24 otherwise has access to the necessary pipeline nodes), the pipeline builder is able to design and instantiate a pipeline 20 between the application 12 and the add-in 16 in virtually any situation.

Still referring to FIGS. 1-4, alternate embodiments of the run-time environment 10 are contemplated. For example, the pipeline builder 24 may be operable to design the pipeline 20 for instantiation between executable nodes that are not software application or software add-in nodes. Furthermore, although an embodiment of the pipeline builder 24 is described as being operable to perform certain functions, other embodiments of the builder may be operable to perform any one or more, but fewer than all, of these functions. Moreover, other embodiments of the builder 24 may be operable to perform other functions in addition to, or instead of, the above-described functions.

Figure 5A:
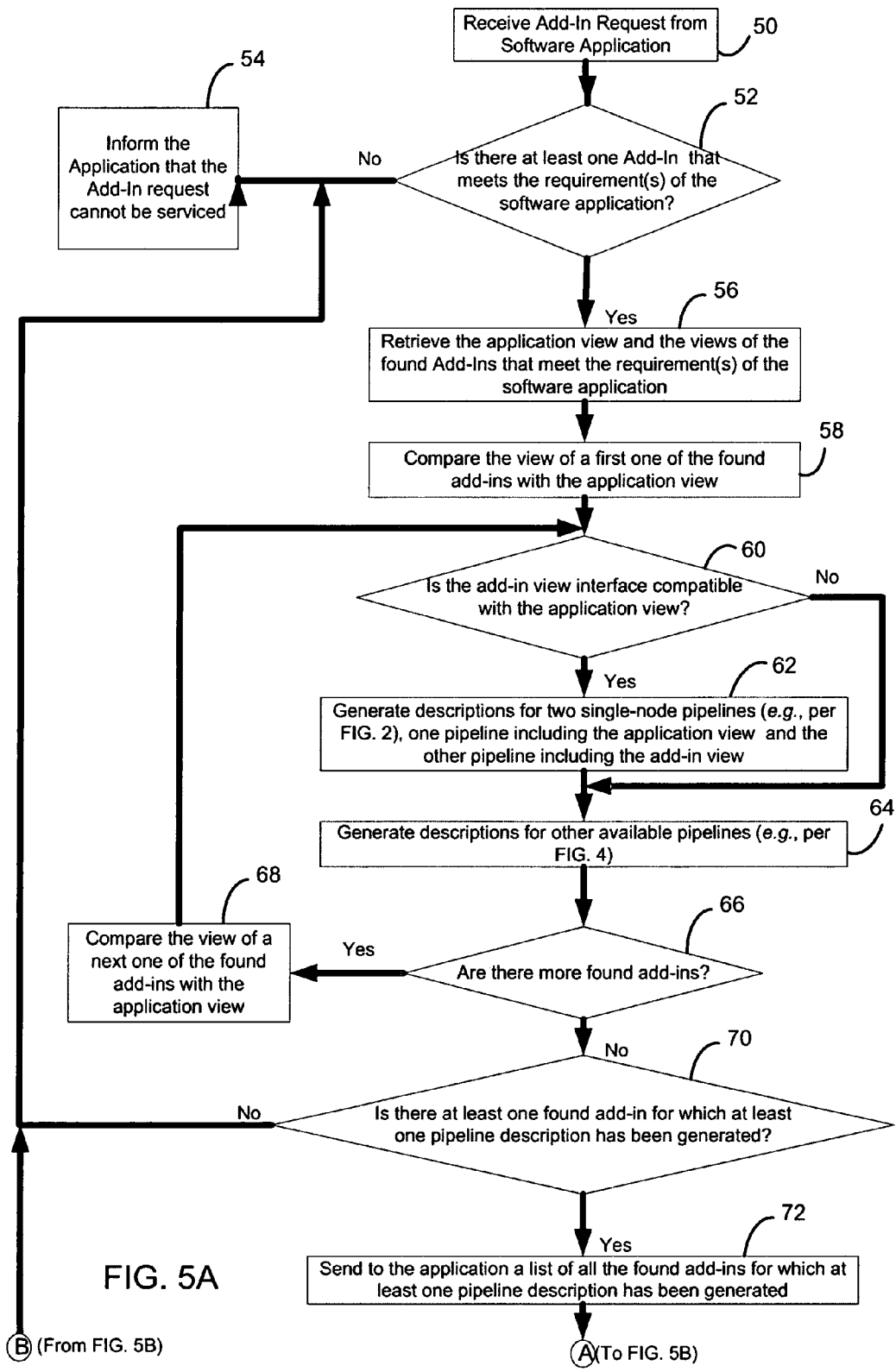
FIGS. 5A and 5B compose a flow chart that shows the operation of an embodiment of the pipeline builder of FIG. 1.
Figure 5B:
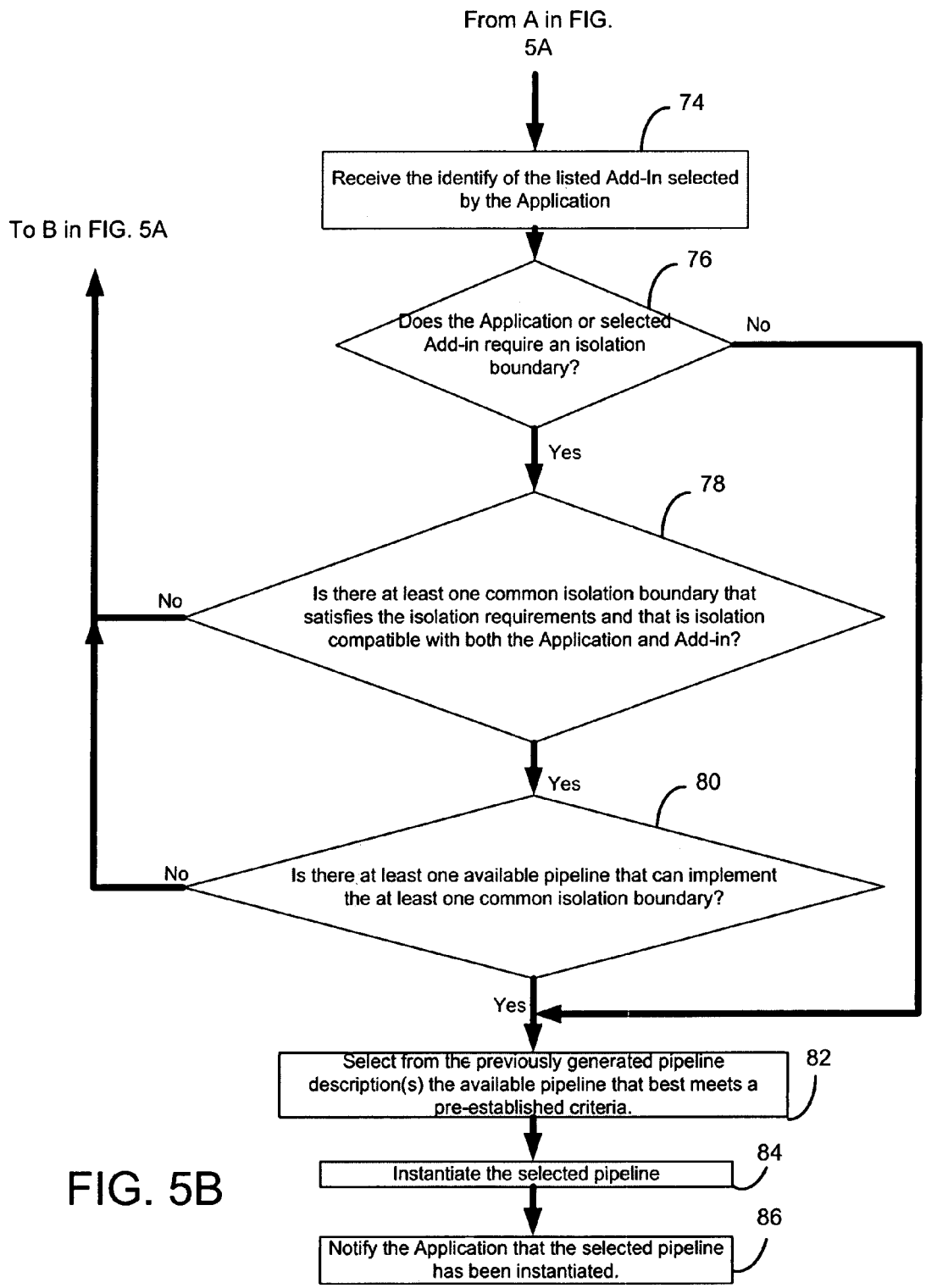

FIGS. 5A and 5B compose a flow chart that describes the operation of an embodiment of the pipeline builder 24 of FIG. 1. Although for example purposes the operation of the pipeline builder 24 is discussed in conjunction with the application 12 calling the add-in 16, the operation may be similar for any software node calling any other software node.

The portion of the flow chart in FIG. 5A describes the operation of the pipeline builder 24 during a pipeline-design phase, and the portion of the flow chart in FIG. 5B describes the operation of the pipeline builder during a pipeline-instantiation phase.

Generally, during the pipeline-design phase, the pipeline builder 24 identifies one or mode add-ins that meet the criteria specified by the application 12, designs and generates descriptions of all the possible pipelines that can be instantiated between the application and the identified add-ins given the available view nodes and other pipeline nodes, and presents to the application the identified add-ins for which at least one pipeline description has been generated—a pipeline description is a design specification, for example, in the form of a file, that describes the pipeline and from which the pipeline builder can instantiate the pipeline.

And, generally, during the pipeline-instantiation phase, the pipeline builder 24 determines whether or not the application or add-in selected by the application requires an isolation boundary. If an isolation boundary is required, then the pipeline builder 24 determines from the previously generated pipeline descriptions whether there are any available pipelines that can implement the required boundary, and, if there is at least one such pipeline, instantiates one of these at least one pipelines between the application and the selected add-in. If no isolation boundary is required, then the pipeline builder 24 may instantiate any one of the available pipelines from the respective pipeline description. If in either of the above situations (i.e., isolation boundary or no isolation boundary required) there are multiple available pipelines, then the pipeline builder 24 may select from the available pipelines based on a predetermined criteria. For example, the builder 24 may select for instantiation the shortest available pipeline.

Referring to FIGS. 1-5A, the operation of an embodiment of the pipeline builder 24 during the pipeline-design phase is described.

Starting at block 50 of FIG. 5A, the pipeline builder 24 receives a request from the software application 12 to find an add-in that meets one or more pre-established requirements, which may be included with the request or provided to the pipeline builder before or after the request. The application 12 may initiate the request in response to a pre-established stimulus, such as a request from a user of the application. For example, if the application 12 is a word processor, then the stimulus may be a user requesting the correct spelling of an English word. In response to the user's request, the word processor requests the builder 24 to find and instantiate an English language spell-check add-in. Furthermore, if the pipeline builder 24 is not instantiated at the time of the request from the application 12, then the application's request may serve to instantiate the builder.

Next, at block 52, the pipeline builder 24 finds available add-ins that meet the pre-established requirement(s) specified by the application 12. For example, the pipeline builder 24 may search the sub-store 26 and/or any other location that may store add-ins that meet the specified requirements.

If the pipeline builder 24 cannot find any such add-ins, then, at block 54, the pipeline builder 24 informs the software application 12 via an error message or in another conventional manner that the requested add-in is unavailable, and thus that the pipeline builder cannot service the add-in request. The application 12 may then process this information in a conventional manner.

But if the pipeline builder 24 finds at least one add-in that meets the specified requirement(s), then, at block 56, the pipeline builder retrieves the application view 14 and the respective add-in view for each of the found add-ins. For example, the pipeline builder 24 may retrieve the application view 14 from the application 12, from the sub-store 28, or from any other location, and may retrieve each of the add-in views from the respective add-in, the sub-store 26, or from any other location.

Next, at block 58, the pipeline builder 24 compares the application view 14 with the view of a first one of the found add-ins.

Then, at block 60, the pipeline builder 24 determines whether the first add-in view is interface compatible with the application view 14.

If the first add-in view is interface compatible with the application view 14, then, at block 62, the pipeline builder 24 generates respective pipeline descriptions for the two single-node pipelines (e.g., the pipeline 20 of FIG. 2) that respectively include the application view 14 and the view of the first add-in. The pipeline descriptions may be respective files or may have any other suitable format. The pipeline builder 24 generates descriptions for two single-node pipelines instead of only one single-node pipeline because if the application 12 or the found add-in requires an isolation boundary (discussed below in conjunction with FIG. 5b), then having two pipeline descriptions increases the chances that at least one of the single-node pipelines is able to implement the isolation boundary. Alternatively, because the first add-in view is interface compatible with the application view 14, the pipeline builder 24 may generate a description for only one single-node pipeline that includes either the first add-in view or the application view.

Next, at block 64, the pipeline builder 24 generates descriptions for other available pipelines between the first add-in and the application 12. An available pipeline is a pipeline that the pipeline builder 24 can design and instantiate from available pipeline nodes, including the nodes in the store 22 and nodes in other locations to which the pipeline builder has access. The other available pipelines may include single-node pipelines having nodes other than the application view 14 and the first add-in view, or multi-node pipelines, for example like the pipeline 20 of FIG. 4. As discussed above, the pipeline builder 24 generates descriptions for these other available pipelines to increase the chances that at least one of these available pipelines is able to implement an isolation boundary that the application 12 or the first found add-in may require. Alternatively, if the pipeline builder 24 generates a description of at least one single-node pipeline per block 62, then the builder may skip block 64.

Referring back to block 60, if the first add-in view is not interface compatible with the application view 14, then the pipeline builder 24 skips block 62 and proceeds directly to block 64.

Next, at block 66, the pipeline builder 24 determines whether there are any more found add-ins.

If there is another found add-in, then, at block 68, the pipeline builder 24 compares the view of the next (e.g., the second) found add-in with the application view 12, and repeats the steps in blocks 60, 62, 64, and 66 as described above.

But if there are no more found add-ins, then the pipeline builder 24 proceeds to block 70.

At block 70, the pipeline builder 24 determines whether there is at least one found add-in for which the builder has generated a pipeline description. That is, the pipeline builder 24 determines whether there is at least one found add-in for which the builder can instantiate a pipeline with the available pipeline nodes.

If there is at least one such add-in, then, at block 72, the pipeline builder 24 provides a list of these add-ins to the application 12. The list may be in the form of a folder including files that each contain the source or compiled code of a respective add-in or, the list may be in any other form.

The application 12 then selects an add-in from the list, and provides the identity of the selected add-in to the pipeline builder 24, which then enters the pipeline-instantiation phase as discussed below in conjunction with FIG. 5B. Alternatively, the application 12 may select more than one add-in from the list, or the pipeline builder 24 may select one or more add-ins from the list instead of or in addition to the application.

But if there is no found add-in for which the pipeline builder 24 was able to generate a pipeline description, then, at block 54, the pipeline builder 24 informs the software application 12 via an error message or in another conventional manner that the builder cannot service the add-in request because the necessary pipeline nodes are unavailable to the builder. The application 12 may then process this information in a conventional manner.

Referring to FIGS. 1-4 and 5B, the operation of an embodiment of the pipeline builder 24 during the pipeline-instantiation phase is discussed.

At block 74, the pipeline builder 24 receives from the application 12 the identify of the listed add-in that the application has selected for instantiation. Alternatively, the pipeline builder 24 may receive from the application 12 the identifies of multiple listed add-ins that the application has selected for instantiation. In this latter situation, the below-described steps of the pipeline-instantiation phase may be repeated for each identified add-in. Alternatively, the pipeline builder 24 may select the one or more listed add-ins for instantiation, particularly if there is only one listed add-in. If the pipeline builder 24 selects the one or more listed add-ins, then the pipeline builder may skip block 74. But for example purposes, it is assumed in the following description that the either the application 12 or the pipeline builder 24 has selected the add-in 16 of FIG. 1 for instantiation.

At block 76, the pipeline builder 24 determines whether the application 12 or the selected add-in 16 requires an isolation boundary.

If neither of the application 12 nor the add-in 16 requires an isolation boundary, then the pipeline builder 24 proceeds to block 82, which is described below.

But if either the application 12 or add-in 16 requires an isolation boundary, then, at block 78, the pipeline builder 24 determines whether there is at least one common isolation boundary that satisfies the isolation requirements and that is isolation compatible with both the application 12 and the add-in 16. For example, if the application 12 requires an isolation boundary of level-three or higher and the add-in 16 can transfer data across an isolation boundary of level four or higher, then an isolation boundary of level four or higher satisfies the isolation requirements and is compatible with both the application 12 and the add-in 16. Conversely, if the application 12 requires an isolation boundary of level-three or higher and the add-in 16 can transfer data across an isolation boundary of only level two or lower, then there is no common isolation boundary, because no isolation boundary satisfies the isolation requirements and is compatible with both the application 12 and the add-in 16.

If there is no common isolation boundary that satisfies the isolation requirements and that is compatible with both the application 12 and the add-in 16, then, at block 54 (FIG. 5A), the pipeline builder 24 informs the software application 12 via an error message or in another conventional manner that the builder cannot service the add-in request because the builder cannot implement the required isolation boundary. The application 12 may then process this information in a conventional manner.

But if the pipeline builder 24 determines that there is at least one common isolation boundary that satisfies the isolation requirements and that is compatible with both the application 12 and the add-in 16, then, at block 80, the builder determines whether there are any available pipelines that can implement the at least one common isolation boundary between the application 12 and the add-in 14. To make this determination, the pipeline builder 24 examines the previously generated descriptions of the available pipelines between the application 12 and the add-in 16. For example, if one of the common isolation boundaries is a level-three isolation boundary, there is available a single-node pipeline that includes the application view 14, and the application view is remotable across a level-three boundary, then this single-node pipeline can implement a common isolation boundary, for example, as discussed above in conjunction with FIG. 3. Or, if one of the common isolation boundaries is a level-four isolation boundary and there is available a multi-node pipeline that can implement a level-four boundary, then this multi-node pipeline can implement a common isolation boundary, for example, as discussed above in conjunction with FIG. 4.

If the pipeline builder 24 determines that there are no available pipelines that can implement a common isolation boundary, then, at block 54 (FIG. 5A), the pipeline builder informs the software application 12 via an error message or in another conventional manner that the builder cannot service the add-in request because the builder cannot instantiate a pipeline that implements the required isolation boundary. The application 12 may then process this information in a conventional manner.

But if the pipeline builder 24 determines that there is at least one available pipeline that can implement common isolation boundary, then the builder proceeds to block 82.

At block 82, the pipeline builder 24 selects from the previously generated pipeline descriptions the available pipeline that best meets one or more pre-established criteria. For example, if there are multiple available pipelines, a pre-established criteria may be that the pipeline builder 24 select an available pipeline having the fewest nodes. Under this criteria, if there is one available single-node pipeline 20, for example, as described above in conjunction with FIG. 2, and one available multi-node pipeline, for example, as described above in conjunction with FIG. 4, then the pipeline builder 24 selects the available single-node pipeline. Or, where an isolation boundary is required, then a pre-established criteria may be that the pipeline builder 24 select an available pipeline that implements the common isolation boundary having the lowest possible isolation level. Under this criteria, if a common isolation boundary of at least level three is required, a first available pipeline can implement at minimum a level-four isolation boundary, and a second available pipeline can implement at minimum a level-five isolation boundary, then the pipeline builder 24 selects the first available pipeline. If multiple available pipelines meet the pre-established criteria to the same degree (e.g., multiple available pipelines each have a single node), then the pipeline builder 24 may choose among these available pipelines in a pre-established manner, for example, according to another pre-established criteria.

Next, at block 84, the pipeline builder 24 instantiates the selected pipeline as the pipeline 20 (FIG. 1). For example, if the selected pipeline is similar to the pipeline 20 of FIG. 4, then the pipeline builder 24 retrieves the adapter nodes 34*a* and 34*b* and the protocol node 36 from the sub-store 28 (the pipeline builder may already have the application view 14 and the add-in view 18 per block 56 in FIG. 5A, or may retrieve these views from the sub-store 28), and instantiates these nodes along with the application-view and add-in-view nodes to instantiate this pipeline between the application 12 and the add-in 16.

Next, after instantiating the pipeline 20 per block 84, at block 86, the pipeline builder 24 notifies the application 12 that the pipeline has been instantiated. In response to this notification, the application 12 and the add-in 16 may proceed to communicate via the instantiated pipeline 20.

Referring to FIGS. 5A and 5B, alternate embodiments of the disclosed operation are contemplated. For example, other embodiments of the pipeline builder 24 may perform fewer or more steps than those discussed, and may perform the steps in an order different from that discussed. Furthermore, some of these steps may be performed by an executable software node other than the pipeline builder 24.

From the foregoing it will be appreciated that, although specific embodiments have been described herein for purposes of illustration, various modifications may be made without deviating from the spirit and scope of the invention. Furthermore, where an alternative is disclosed for a particular embodiment, this alternative may also apply to other embodiments even if not specifically stated.

What is claimed is:

1. A method, comprising:
comparing a first view of a first executable node to a second view of a second executable node;
determining whether at least one of the first executable node or the second executable node require an isolation boundary, the isolation boundary specifying one or more isolation levels;
if at least one of the first executable node or the second executable node require an isolation boundary:
determining whether at least one communication pipeline can implement the required isolation boundary;
selecting from the at least one communication pipeline that can implement the required isolation boundary a particular communication pipeline that best meets a pre-established criteria; and
instantiating between the first and second nodes the particular communication pipeline.

2. The method of claim 1 wherein:
one of the first and second executable nodes comprises a software application; and
the other of the first and second executable nodes comprises a software add in.

3. The method of claim 1 wherein:
the particular communication pipeline comprises a first number of executable nodes that are separate from the first and second nodes.

4. The method of claim 1 wherein:
the particular pipeline includes a single executable node.

5. The method of claim 1 wherein:
the first pipeline includes one of the first and second views and no other nodes.

6. The method of claim 1, further comprising retrieving the first and second views before comparing the views.

7. The method of claim 1 wherein:
instantiating the particular pipeline comprises instantiating the particular pipeline if the first and second views are compatible.

8. A method, comprising:
comparing a first view of a first executable node to a second view of a second executable node, one of the first and second nodes requiring an isolation boundary;
determining whether a first communication pipeline can implement the required isolation boundary;
instantiating between the first and second nodes the first communication pipeline having a first structure if the first view has a first pre established relationship to the second view and the first communication pipeline is operable to transfer data across the isolation boundary; and
instantiating between the first and second nodes a second communication pipeline having a second structure if
the first view has a second pre established relationship to the second view, or
the first view has the first pre established relationship to the second view and the first communication pipeline is inoperable to transfer data across the isolation boundary.

9. The method of claim 8, further comprising:
wherein instantiating the first pipeline comprises instantiating the first pipeline only if the first and second nodes are compatible with the isolation boundary;

wherein instantiating the second pipeline comprises instantiating the second pipeline only if the first and second nodes are compatible with the isolation boundary; and instantiating no pipeline between the first and the second nodes if one of the first and second nodes is incompatible with the isolation boundary.

10. The method of claim 8 wherein:

the first communication pipeline comprises a first number of executable nodes that are separate from the first and second nodes; and the second communication pipeline comprises a second number of executable nodes that are separate from the first and second nodes, the second number greater than the first number.

11. The method of claim 8 wherein:

the first pipeline includes a single executable node that is operable to transfer data across the isolation boundary; and the second pipeline includes multiple executable nodes, at least one of the nodes operable to transfer data across the isolation boundary.

12. The method of claim 8 wherein:

the first pipeline includes one of the first and second views and no other nodes, the one of the first and second views operable to transfer data across the isolation boundary; and the second pipeline includes the first view, a first adapter node operable to communicate with the first view, a protocol node operable to communicate with first adapter node and to transfer data across the isolation boundary, a second adapter node operable to communicate with the protocol, and the second view operable to communicate with the second adapter.

13. The method of claim 8 wherein:

the first view has the first pre established relationship to the second view if each of the first and second views can transfer data to and from the first node and to and from the second node; and the first view otherwise has the second pre established relationship to the second view.

* * * * *